United States Patent [19]
Wallace

[11] 3,923,195
[45] Dec. 2, 1975

[54] SEALED INDICATOR MECHANISM

[75] Inventor: John Bernard Wallace, Ickenham, England

[73] Assignee: TRW Inc., Cleveland, Ohio

[22] Filed: Apr. 29, 1974

[21] Appl. No.: 464,946

[30] Foreign Application Priority Data
May 4, 1973 United Kingdom .................. 21465

[52] U.S. Cl. .................. 220/309; 220/67; 73/290 R
[51] Int. Cl.² ........................................... G01F 23/02
[58] Field of Search ............ 73/290, 323, 326, 334; 116/117, 118; 220/352, 356, 67, 309

[56] References Cited
UNITED STATES PATENTS

| | | | |
|---|---|---|---|
| 2,548,359 | 4/1951 | Gandhi | 128/227 |
| 3,277,713 | 10/1966 | Demyon | 73/334 |
| 3,371,648 | 3/1968 | Favima | 116/117 |
| 3,397,808 | 8/1968 | Jones | 73/323 |

FOREIGN PATENTS OR APPLICATIONS

| | | | |
|---|---|---|---|
| 1,458,471 | 10/1966 | France | 73/323 |

*Primary Examiner*—Richard E. Aegerter
*Assistant Examiner*—A. J. Mirabito
*Attorney, Agent, or Firm*—James R. O'Connor

[57] ABSTRACT

An assembly of a disc-shaped plate which may comprise the plate portion of fluid level indicator mounted in an aperture in a panel, such as the wall of a fluid container with the aid of a resilient cup shaped seal. The disc-shaped plate has an annular side surface bounded by upper and lower surfaces and the seal comprises a base, an annular side wall adapted to snugly engage within a circular aperture and an outwardly directed circumferential flange or wall adapted in use to rest on the upper surface of the apertured panel. The dimensions and shape of the side surface of the plate and of the wall of the seal are such that when the seal is mounted in the aperture in the panel, the plate can be pressed downwardly into the cup shaped seal and when pressed home against the base of the seal, the side surface of the plate will compress the wall of the seal against the rim of the aperture and expand the wall of the seal behind the panel to form a seal between the panel and the plate and retain the plate in the aperture.

2 Claims, 6 Drawing Figures

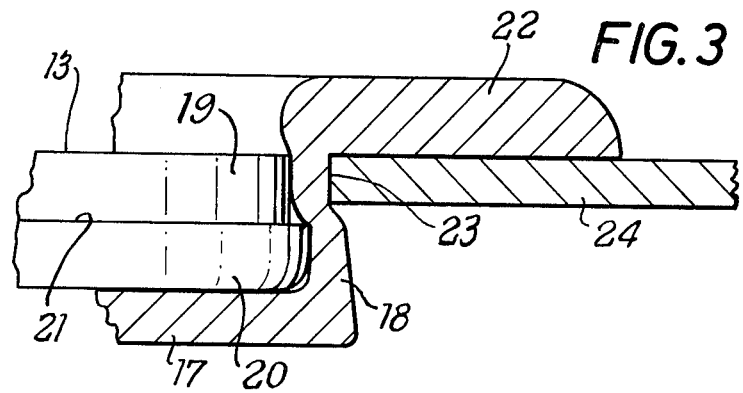
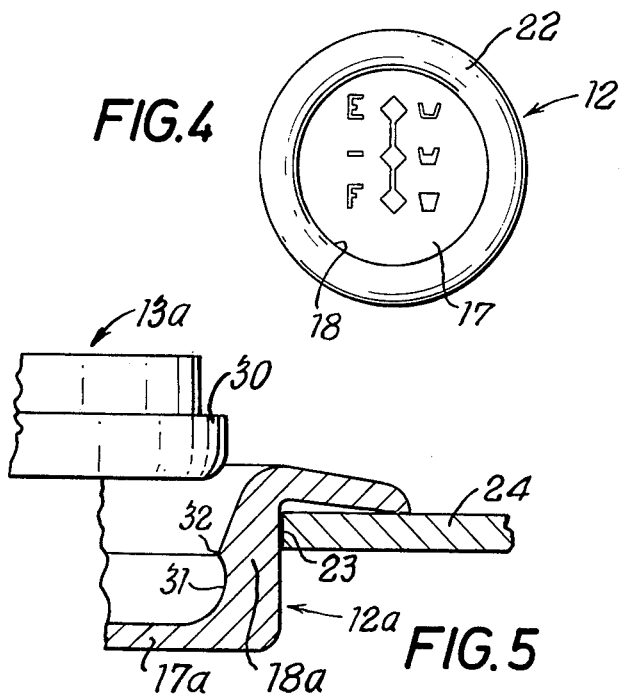
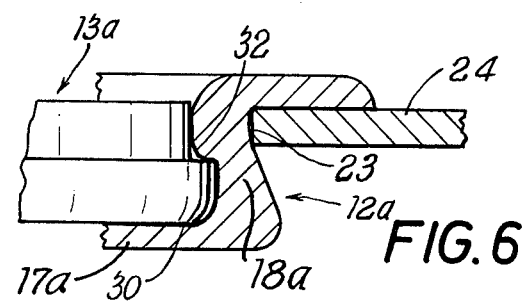

SEALED INDICATOR MECHANISM

BACKGROUND TO THE INVENTION

The present invention relates to an assembly of a disc shaped plate such as the plate portion of a fluid level indicator, mounted in an aperture in a panel, for instance the wall of a fluid container with the aid of a cup seal.

I have found that there is a need to provide an effective seal for a fluid level indicator which can be seated in an aperture in a fluid container or reservoir and it is an object of the present invention to provide a seal assembly for such a fluid level indicator.

It is a further object of the present invention to provide a seal assembly for a fluid level indicator which is simple to assemble but which still provides a seal with the aperture, which will prevent leakage and which will withstand substantial pressure, vibration and impact without spillage.

STATEMENT OF THE INVENTION

In one form of the present invention, there is provided an assembly comprising a disc-shaped plate, such as the plate portion of a fluid level indicator, mounted in an aperture in a panel with the aid of a resilient cup shaped seal wherein the plate has an annular side surface bounded by upper and lower surfaces and the seal comprises a base, an annular side wall adapted to fit within a circular aperture and an outwardly directed circumferential wall adapted in use to abut the periphery of the aperture in the panel, the dimensions and shape of the side surface of the plate and of the wall of the seal being such that when the seal is mounted in the aperture in the panel and the plate is inserted into the seal, the wall of the seal is compressed against the rim of the aperture and is expanded behind the panel.

DESCRIPTION OF THE DRAWINGS

FIG. 3 is an elevation partly in section of a detail of FIG. 1 on an enlarged scale, FIG. 4 is a plan view of the cup seal shown in FIGS. 1 to 3 and FIGS. 5 and 6 are views similar to FIG. 3 showing an alternative embodiment of the assembly of FIGS. 1 to 3.

DETAILED DESCRIPTION OF THE PREFERRED EMBODIMENTS

Figure 1:
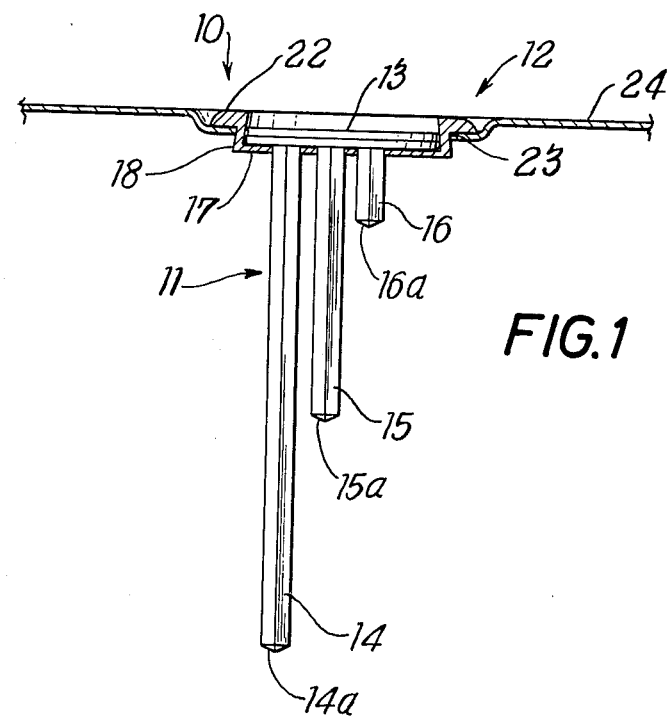
FIG. 1 is an elevation partly in section of an assembly according to the present invention mounted in an aperture in a panel.

In the drawings a fluid level indicator assembly is shown generally at 10, which comprises an indicator mechanism 11 and a cup seal 12.

The indicator mechanism 11 comprises a disc-shaped plate 13 and three square section elongate rods 14, 15 and 16 which are of different lengths and which project downwardly from the underside of the plate 13. Both the plate 13 and the rods 14, 15 and 16 are injection moulded from a transparent or translucent material such as an acrylic resin.

The outer end of each rod is pointed and pyramidal in shape so as to include inclined surfaces 14a, 15a and 16a respectively which will reflect light transmitted through the plate 13 and along the rods back to the plate 13.

The cup seal 12 which forms the subject of the present invention is substantially cup shaped and comprises a base 17 formed with apertures through which the rods 14, 15 and 16 extend and an annular side wall 18 which forms a seal against the periphery of the plate 13. The wall 18 slopes radially inwardly away from the base 17 and when unstressed is of approximately constant thickness.

The outer peripheral surface of the plate 13 is stepped so as to have a major cylindrical wall portion 19, a minor cylindrical wall portion 20 and an annular shoulder 21. The diameters of the major wall portion 19 and the minor wall portion 20 lie within the maximum and minimum diameters of the inwardly sloping wall 18, so that the annular shoulder 21 will expand the wall 18 outwardly when the indicator 11 is mounted in the cup seal 12. The seal 12 also includes an outwardly extending annular flange 22 which is adapted to rest on the outer surface of a panel in which the seal is mounted.

In use, the seal 12 is inserted as shown in FIG. 3 through an aperture 23 in a panel 24, which may for instance be the top of a fluid container such as an oil heater reservoir, with the flange 22 resting on the upper surface of the panel 24. When the seal 12 is unstressed the base 17 and the wall 18 will pass easily through the aperture 23. The indicator mechanism 11 is then brought up to the seal 12, the rods 14 to 16 are pushed through the apertures in the base 17 and the plate 13 is pressed home into the seal 12. The depth of the plate 13 is such that the minor portion 19 compresses the wall 18 against the rim of the aperture 23 and the major portion 20 expands the wall 18 outwardly beneath the panel 24.

In the assembled position, as shown in FIG. 3, the minor wall portion 20 of the plate 13 has compressed the wall 18 against the rim of the aperture and the major wall portion 19 has expanded the wall 18 outwardly below the panel 24 so as to form an effective seal between the aperture and the outer surface of the wall 18. A complete seal is thereby provided between the plate 13 and the inner surface of the wall 18 of the seal and between the outer surface of the wall 18 of the seal and the rim of the aperture in the panel. In addition, the shoulder 21 of the plate 13 is positioned below the panel 24 and provides a positive resistance to removal of the indicator mechanism from the cup seal.

So long as the outer end of each of the rods 14 to 16 remain above the liquid in the container, light is transmitted along the rods and reflected back by the inclined surfaces at the outer end of each rod. As the container is filled with a fluid, the fluid will surround and cover the bottom of the rod 14 and the upper end of the rod 14 which can be seen through the upper surface of the plate 13 will become opaque. In this manner the level of the fluid in the container is visually indicated on the top of the plate 13.

Figure 2:
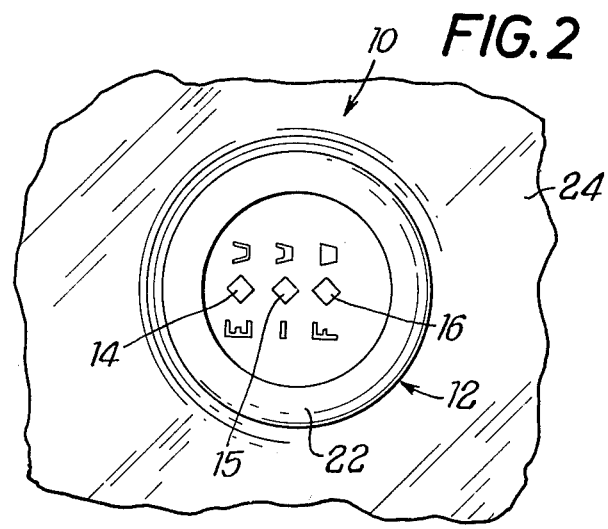
FIG. 2 is a plan view of the assembly shown in FIG. 1.

The upper surface of the plate 13 and/or alternatively the base 17 which can be seen through the plate 13 can carry an indication of the depth of the fluid in the container, for instance as shown in FIG. 2.

The cup seal 12 can be made of a suitable elastomeric material such as a synthetic rubber or plastics material.

The indicator assembly 10 can be used to measure the level of any fluid in a container provided that the fluid is such that it will render the upper ends of the rods 14 to 16 as seen through the plate opaque when the bottom ends of the rods are covered in the fluid.

The indicator mechanism 11 cannot be readily removed from the seal 12 when assembled in the container aperture and will withstand substantial pressure, vibration and impact without spillage or undue leakage.

It will be appreciated that the shape of the plate 13 and the seal 12 can be modified, for instance as shown in FIGS. 5 and 6. In FIGS. 5 and 6 a plate 13a is shown having a circumferential rib 30, which is externally part-circular in section and which locates in an annular groove 31 in a cup seal 12a. The groove 31 is formed in the internal surface of the side wall 18a of the seal 12a adjacent the base 17a and the internal diameter of the seal 12a is such that the plate compresses the wall 18a against the rim of the aperture and the rib 30 expands the wall 18a outwardly behind the panel 24 so as to form an effective seal between the plate 13a and the rim of the aperture in the panel. The groove 31 in the seal 12a is bounded by a lip 32 which assists in retaining the rib 30 in the groove 31 and thereby holds the plate 13a in the seal 12a.

It will be appreciated that the shape of the outer surface of the plate which engages and expands the wall of the seal and the shape and thickness of the wall of the seal can be varied, provided that the dimensions of the plate and the wall of the seal are such that the wall of the seal is compressed against the rim of the aperture and expanded behind the panel when the plate is pressed fully home into the seal. For instance, the wall of the seal can be thickened substantially internally, adjacent the base of the seal and the side wall of the plate tapered towards its bottom surface so that the required expansion is achieved although the diameter of the plate is less adjacent its bottom surface than its top surface. This construction has the advantage that the plate, being tapered towards its bottom surface can be easily centered in the seal and pressed home.

What I claim is:

1. An assembly sealing a circular opening in a panel aperture comprising a cup-shaped seal formed from a relatively resilient material disposed in the panel aperture and a disc-shaped plate formed from a substantially rigid material, said seal including a base, a side wall joined to the base and having a substantially cylindrical external surface to facilitate insertion into the panel aperture and cooperating with the base to define a plate-receiving cavity having a depth substantially greater than the thickness of the panel and a circumferential flange extending radially outwardly from the end of the side wall opposite the base, which flange overlies the outer surface of the panel adjacent the rim of the aperture therein, the internal portion of the side wall defining the cavity having an inwardly directed protrusion extending toward the central axis of the cavity, the plate having a thickness substantially greater than the thickness of the panel at the aperture therein and a diameter greater than the diameter of the cavity in the seal, the plate being seated in the cavity and compressing the side wall of the seal against the rim of the panel aperture and expanding portions of the wall at the protrusion outwardly beneath the inner surface of the panel adjacent the aperture therein, and said plate being seated against the base of the seal and having a shoulder defining a retaining surface which lies substantially parallel to the inner surface of the panel and compresses the material of the wall of the seal between said surface and the inner surface of the panel adjacent the aperture therein.

2. An assembly as claimed in claim 1 wherein the side wall of the seal is thicker adjacent the base of the seal.

* * * * *